June 11, 1929.   F. B. HOWELL   1,717,214
RESILIENT WHEEL
Filed March 29, 1924

Inventor:
Fred B. Howell,
by
His Attorney.

Patented June 11, 1929.

1,717,214

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

RESILIENT WHEEL.

Application filed March 29, 1924. Serial No. 702,998.

My invention relates to wheels of the type in which relatively rotatable rims and hubs are connected by cushioning devices to absorb the shocks to which the rim or hub may be subjected and where two such wheels are mounted on the same shaft, to take up any misalignment of the gear teeth on said wheels.

Such resilient wheels often have one of the parts made out of hard material, which is consequently difficult to work. This part is usually the rim. My invention has for one of its objects, a novel construction of wheel which is cheap to manufacture, in that the portion of the wheel made of hard material requires a minimum amount of work thereon.

A further object of my invention is to provide a new resilient wheel in which, with a certain length of spring, a greater amount of movement of the rim with reference to the hub can be obtained than was heretofore possible.

My construction also makes it possible materially to reduce the thickness of the wheel rim. This saving in material further reduces the cost of manufacture of my wheel, since the rims are usually made of expensive material, such as a steel forging.

Figure 1:
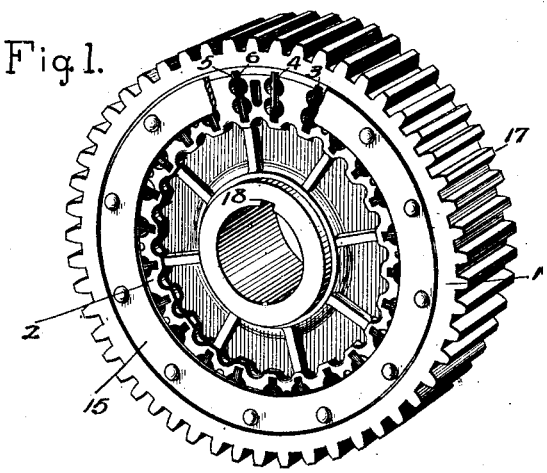
Figure 2:
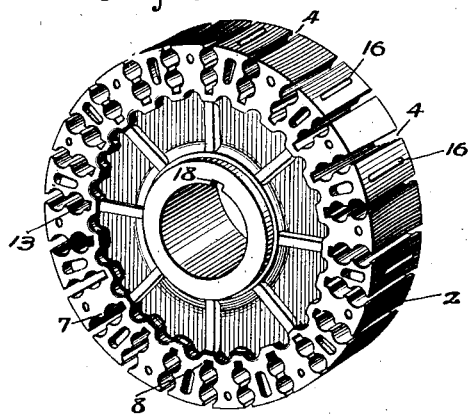
Figure 3:
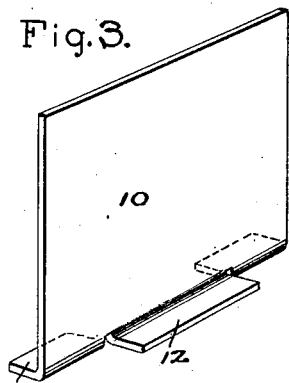
Figure 4:
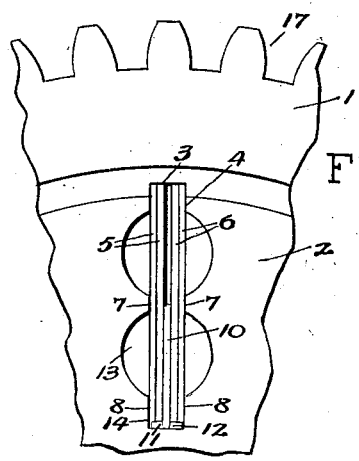

The various features of novelty which characterize my invention are pointed out with particularity in the claims annexed to and forming a part of this specification. For a better understanding of my invention, reference may be had to the following description, taken in connection with the accompanying drawing, in which Fig. 1 is a perspective view of the resilient wheel embodying my invention; Fig. 2 is a perspective view of the hub of the wheel of Fig. 1; Fig. 3 is a view of a detail and Fig. 4 is an enlarged view of a portion of my wheel.

In the drawing, the resilient wheel is shown as a gear wheel which comprises two parts 1 and 2. The outer part or rim 1 is shown in the form of a ring having slots 3 in its inner periphery. The inner part or hub 2 cooperates with the rim 1 and has slots 4 in its outer periphery registering with the slots 3 in the rim. The inside diameter of the rim 1 and the outside diameter of the hub 2 are approximately equal. Leaf springs 5 and 6 are placed in the slots 3 and 4. These springs are fulcrumed or supported against a plurality of supports in the form of shoulders 7 and 8 in the hub of the wheel. These supports are spaced apart and are adapted to allow the springs to deflect between them and into the circular recesses 13 between the supports. The ends of the springs which extend into the slots 3 in the rim are spaced apart, as clearly shown in Fig. 4 of the drawing. Means are provided in the form of a spacing member 10 for holding the springs against the support 7 and 8. This member 10 is shaped as shown in Fig. 3. It has flanges 11 and 12 which project under the springs 5 and 6 and is thereby held in place.

The rims of such resilient wheels are usually forged out of steel, which is difficult to work. It will be noted that the slots 3 in the rim are shallow and rectangular in cross section and consequently require a minimum amount of machining. Since these slots are shallow, the thickness of the rim for the required strength can be made much smaller than was heretofore possible. The slots 4 in the hub are deep and the greater portion of the springs is disposed in these slots. The hub is cut away at 13 between the supports 7 and 8 forming recesses to allow the springs to deflect between these supports. The supports 8 for the springs are placed at the ends thereof and at the bottom 14 of the slots 4. The supports 7 are placed between the ends of the springs and substantially midway of their length. Since the springs have their ends, which are located in the slots 3 in the rim, spaced apart, and since they rest against substantially rigid supports in the hub 2 near the middle of the springs and at the further ends thereof, they are loaded as beams having a concentrated load between the supports and the amount of movement of the rim with reference to the hub is a maximum with a given permissible bending stress.

The shallow slots 3 are preferably made narrower than the bottoms 14 of the deep slots 4, in order to give the springs 5 and 6 an initial deflection. In order to prevent the lateral displacement of the springs after they are put in place, the usual end plates 15 are fastened to the hub. The hub is also provided with holes 16 to which oil is supplied in order to lubricate the parts of the wheel. I have shown the rim as being provided with teeth 17 on its outer periphery and the hub 2 as being provided with a key-way 18 for fastening the hub to a shaft or axis.

I desire it to be understood that my invention is not limited to gear wheels as it may be used without change in other driving mechanisms, such as pulleys, armatures, dynamo electric machines and the like.

What I desire as new and desire to secure by Letters Patent of the United States is:

1. A resilient wheel comprising an outer member in the form of a ring having slots in its inner periphery, an inner member cooperating with said outer member and having deep slots in its outer periphery registering with said slots in the outer member, the sides of said deep slots being shaped so as to form a plurality of radially spaced supports with recesses between them, the inside diameter of the outer member and the outside of the inner member being approximately equal, a plurality of leaf springs in said deep slots extending into said shallow slots, and a spacing member in said deep slots extending between said radially spaced supports for retaining said springs adjacent said supports and the ends of said springs in said shallow slots in spaced relation, so that one of said springs can be deflected independently of the other into the recess between said supports upon movement of said ring member relative to said other member.

2. A resilient wheel comprising a plurality of members, one of said members being in the form of a ring and surrounding the other member, the inside diameter of said member in the form of a ring and the outside diameter of the other member being approximately equal, one of said members having shallow slots in its periphery and the other of said members having deep slots in its periphery registering with said slots in the other member, a plurality of leaf springs in said slots, the ends of said leaf springs being spaced apart in said shallow slots, the other ends of said springs having a support in the other of said members, a support for said springs between the ends thereof, and means for holding said springs against said last mentioned support, said other member being cut away between said supports to allow said springs to deflect between said supports, said shallow slots being narrower than said deep slots in order to give said springs an initial deflection.

3. A resilient wheel comprising an outer member in the form of a ring and having shallow slots in its inner periphery, an inner member cooperating with said outer member and having deep slots in its outer periphery registering with said slots in the outer member, the inside diameter of the outer member and the outside diameter of the inner member being approximately equal, a plurality of leaf springs in said slots, the ends of said leaf springs being spaced apart in said shallow slots, the other ends of said springs having a support in said deep slots, a support in said deep slots for said springs between the ends thereof, and means for holding said springs against said last mentioned support, said inner member being cut away between said supports to allow said springs to deflect between the said supports, said shallow slots being narrower than said deep slots in order to give said springs an initial deflection.

In witness whereof, I have hereunto set my hand this 28th day of March 1924.

FRED B. HOWELL.